(12) United States Patent
Butler et al.

(10) Patent No.: US 6,660,115 B2
(45) Date of Patent: Dec. 9, 2003

(54) METHOD OF MANUFACTURING A CERAMIC MATRIX COMPOSITE

(75) Inventors: Edwin G Butler, Warwick (GB); Anthony G Razzell, Derby (GB); John Dominy, Derby (GB); Paul A Doleman, Derby (GB); Ihsan A H Al-Dawery, Birmingham (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/245,816

(22) Filed: Sep. 18, 2002

(65) Prior Publication Data

US 2003/0034113 A1 Feb. 20, 2003

Related U.S. Application Data

(63) Continuation of application No. 09/461,390, filed on Dec. 15, 1999, now Pat. No. 6,497,776.

(30) Foreign Application Priority Data

Dec. 18, 1998 (GB) ............................................. 9827889

(51) Int. Cl.$^7$ ................................................ B32B 31/20
(52) U.S. Cl. .................... 156/89.11; 156/245; 156/286; 264/621; 264/641; 264/642
(58) Field of Search .............................. 156/89.11, 145, 156/245, 286; 264/621, 641, 642

(56) References Cited

U.S. PATENT DOCUMENTS

| | | | | |
|---|---|---|---|---|
| 4,284,664 A | * | 8/1981 | Rauch, Sr. | |
| 4,460,639 A | * | 7/1984 | Chi et al. | |
| 4,568,594 A | * | 2/1986 | Hordonneau et al. | |
| 4,668,590 A | * | 5/1987 | Yamamoto et al. | |
| 4,859,525 A | * | 8/1989 | Hench et al. | |
| 4,936,939 A | * | 6/1990 | Woolum | |
| 5,126,087 A | * | 6/1992 | Lespade et al. | |
| 5,153,152 A | * | 10/1992 | Dawes et al. | |
| 5,198,282 A | * | 3/1993 | Baker et al. | |
| 5,376,598 A | * | 12/1994 | Preedy et al. | |
| 5,554,271 A | * | 9/1996 | Illston et al. | |
| 5,601,674 A | * | 2/1997 | Szweda et al. | |
| 5,609,741 A | * | 3/1997 | Illston et al. | |
| 5,854,154 A | * | 12/1998 | Radford et al. | |
| 5,955,387 A | * | 9/1999 | Garrigus | |
| 6,277,440 B1 | * | 8/2001 | Reynolds | |
| 6,451,416 B1 | * | 9/2002 | Holowczak et al. | |
| 6,497,776 B1 | * | 12/2002 | Butler et al. | ............. 156/89.11 |

* cited by examiner

Primary Examiner—Curtis Mayes
(74) Attorney, Agent, or Firm—W. Warren Taltavull; Manelli, Denison & Selter PLLC

(57) ABSTRACT

A method of manufacturing a ceramic matrix composite comprises forming a slurry comprising a ceramic sol, filler particles and a solvent and forming laminates of fibers (12). The laminates of fibers (12) are impregnated with the slurry and are stacked (14) on a mold (10). The stack (14) of laminates of fibers (12) is covered by a porous membrane (16), a breather fabric (18) and a vacuum bag (20). The vacuum bag (20) is evacuated and is heated to a temperature of 60° C. for 10 hours to produce a ceramic matrix composite. The ceramic matrix composite is then heated to a temperature of 1200° C. at atmospheric pressure to sinter the ceramic matrix composite.

12 Claims, 1 Drawing Sheet

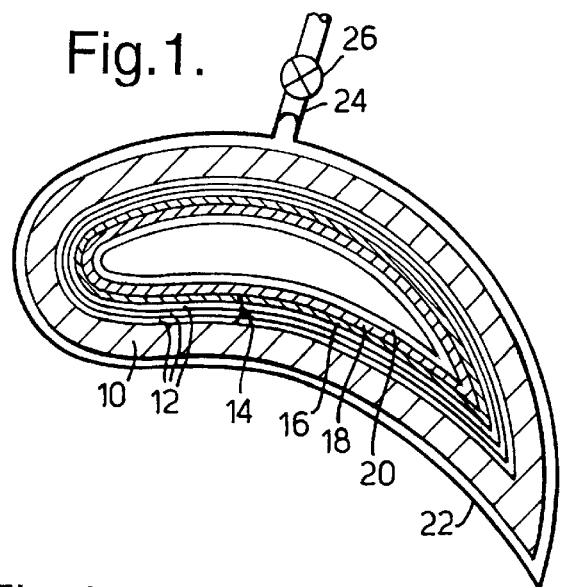
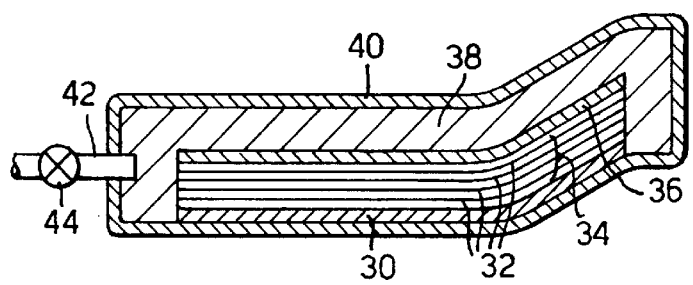
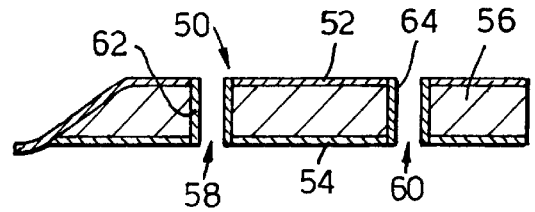
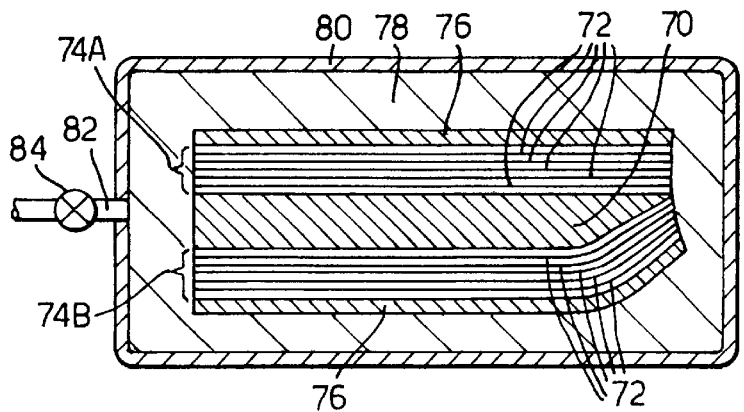

METHOD OF MANUFACTURING A CERAMIC MATRIX COMPOSITE

This application is a Continuation of U.S. application Ser. No. 09/461,390 filed Dec. 15, 1999, now U.S. Pat. No. 6,497,776.

FIELD OF THE INVENTION

The present invention relates to the manufacture of ceramic matrix composites which comprise reinforcing fibres in a ceramic matrix, particularly ceramic fibres in a ceramic matrix.

BACKGROUND OF THE INVENTION

It is known to produce ceramic matrix composites by chemical vapour infiltration, by directed metal oxidation or by sol-gel processes.

The chemical vapour infiltration method comprises forming a fibre preform and then depositing a ceramic matrix on and between the fibres in the fibre preform. The ceramic matrix is deposited by decomposing a chemical compound in the vapour form and depositing the resulting ceramic onto the fibre preform. The chemical vapour infiltration method is a very expensive method and requires expensive apparatus, furthermore in some instances the chemical compounds which are to be decomposed are toxic. The chemical vapour infiltration method has to be performed at a relatively high temperature to decompose the chemical compound.

The directed metal oxidation method comprises forming a fibre preform and then growing a ceramic matrix on and between the fibres in the fibre preform. The ceramic matrix is grown by placing the fibre preform on the surface of a molten metal and oxidising the metal such that the metal oxide grows into the fibre preform. The directed metal oxidation method is also a very expensive method and requires expensive apparatus. Additionally there is always some unreacted metal which is difficult to remove. The directed metal oxidation method also has to be performed at a relatively high temperature to melt the metal.

The sol-gel method comprises either vacuum impregnation or filament winding. The filament winding method comprises passing each fibre through a container of the sol, winding the impregnated fibre on a mandrel of the desired shape, converting the sol to a gel and then heating to convert the gel to a ceramic matrix. The sol-gel method is cheaper than the chemical vapour infiltration method and the directed metal oxidation method and also is performed at a relatively low temperature. The sol-gel method has a low yield and has large shrinkage of the ceramic matrix resulting in cracking of the ceramic matrix. Also multiple infiltration and densification cycles are required.

SUMMARY OF THE INVENTION

The present invention seeks to provide a novel method of manufacturing a ceramic matrix composite.

Accordingly the present invention provides a method of manufacturing a ceramic matrix composite comprising the steps of:

(a) forming a slurry comprising a ceramic sol, filler material and a suspension medium, (b) forming a plurality of laminates of fibres, (c) applying the slurry to each of the plurality of laminates of fibres, (d) stacking the plurality of laminates of fibres on a mould, (e) applying pressure to the stack of laminates of fibres to remove the suspension medium from the slurry to solidify the ceramic sol and thereby produce a ceramic matrix composite.

Preferably step (e) comprises covering the stack with a porous membrane, covering the porous membrane with a breather fabric, covering the breather fabric with a vacuum bag and evacuating the vacuum bag to remove the suspension medium from the slurry to solidify the ceramic sol and thereby produce a ceramic matrix composite.

Preferably the vacuum bag is evacuated to a pressure less than 3000 Pa and held at that pressure for about 10 hours.

Preferably the method comprises heating the stack during or after evacuation of the vacuum bag to encourage the solidification of the ceramic sol. Preferably the stack is heated to a temperature in the range 60° C. to 150° C.

Preferably the method comprises pressure less sintering after evacuation of the vacuum bag.

Preferably the ceramic sol comprises silica, alumina or mullite particles and the filler material comprises silica, alumina or mullite particles. The filler material particles may have a diameter greater than 1 micron and the ceramic sol particles may have a diameter of about 40 nanometers.

Preferably the fibres comprise silica, alumina, mullite or a mixture of any two.

Preferably the mould is hollow and has an inner surface, the method comprising stacking the laminates of fibres on the inner surface of the hollow mould.

The mould may comprise a styrofoam mould. The mould may define an aerofoil shape.

The fibres may comprise mullite or mullite and alumina, the ceramic sol comprises silica and the filler material comprises alumina.

DESCRIPTION OF THE DRAWINGS

The present invention will be more fully described by way of example with reference to the accompanying drawings, in which:

FIG. 1 shows an apparatus for use in manufacturing a ceramic matrix composite according to the present invention.

FIG. 2 shows an apparatus for use in manufacturing a sandwich structure comprising a ceramic matrix composite manufactured according to the present invention.

FIG. 3 shows a sandwich structure comprising a ceramic matrix composite manufactured according to the present invention.

FIG. 4 shows a further apparatus for use in manufacturing a sandwich structure comprising a ceramic matrix composite manufactured according to the present invention.

DESCRIPTION OF THE INVENTION

A method of manufacturing a ceramic matrix composite, as shown in FIG. 1, comprises forming a slurry comprising a ceramic sol, filler material and a suspension medium. The ceramic sol comprises any suitable ceramic for example silica, alumina, mullite, aluminosilicate, silicon nitride, silicon carbide etc. The filler material comprises particles of any suitable ceramic for example silica, alumina, mullite, silicon nitride, silicon carbide and the filler material particles are relatively large compared to the ceramic sol. The filler material particles have a diameter greater than 1 microns. The ceramic sol comprises particles having a diameter of the order of 40 nanometers. The suspension medium comprises for example water. The suspension medium has the characteristic of being removable from the slurry by the application of a vacuum or by the combination of application of a vacuum and heat.

A number of laminates, or plies, of reinforcing fibres are formed. The laminates of fibres may be two dimensional weaves of fibres etc. The fibres may be any suitable fibres for reinforcing a ceramic matrix for example silica, alumina, mullite, aluminosilicate, silicon carbide, silicon nitride or other ceramic fibres.

Each of the laminates of fibres is impregnated with the slurry and the slurry impregnated laminates of fibres 12 are stacked one on top of the other on a mould 10 to form a stack 14. The stack 14 is covered by a porous membrane 16, for example a wet filter paper or a perforated plastic sheet. The porous membrane 16 is covered by a breather fabric or bleeder pack 18 and then the breather fabric 18 is covered by a vacuum bag 20.

In this example the mould 10 comprises a hollow Styrofoam mould and the slurry impregnated laminates of fibers 12 are stacked one on top of the other on the interior surface of the mould 10. The vacuum bag 20 is sealed to an outer bag 22. However, if the slurry impregnated laminates of fibers 12 are stacked on the outer surface of the mould 10 the vacuum bag is sealed to the outer surface of the mold 10.

The interior of the vacuum bag 20 is then connected to a vacuum pump 26 via a pipe 24. The interior of the vacuum bag 20 is then evacuated to a suitably low pressure to consolidate the ceramic matrix composite. The interior of the vacuum bag 20 is evacuated to a pressure less than about 30 mbar (3000 Pa). The application of the low pressure on the slurry impregnated laminates of fibres 12 causes the suspension medium to be removed from the ceramic sol and hence the ceramic sol solidifies causing the ceramic matrix to harden. The application of the low pressure causes the suspension medium to be drawn from the slurry impregnated laminates of fibres 12 through the porous membrane 16 into the breather fabric 18.

The slurry impregnated laminates of fibres 12 are either heated during or after evacuation of the vacuum bag 20, in an autoclave, to encourage the removal of suspension medium and hence the solidification of the ceramic sol. It may be possible to manufacture the ceramic matrix composite at room temperature without the application of heat, but it is preferred to provide heat during or after evacuation to reduce the manufacturing time. It is preferred to heat the slurry impregnated laminates of fibres 12 to a temperature in the range 60 to 150° C. subject to temperature limitations of the mould.

The resulting ceramic matrix composite is then pressure less sintered by heating to a relatively high temperature at atmospheric pressure to complete the processing.

The advantages of the present invention are that the method of manufacturing ceramic matrix composites is relatively cheap in terms of processing costs and apparatus compared to the chemical vapour infiltration and directed metal oxidation methods. Additionally the method of the present invention enables ceramic matrix composites to be produced relatively quickly. The advantages compared to conventional sol-gel methods is a reduction in the number of reinfiltration cycles, and a rigid and durable green body is produced.

EXAMPLE 1

A slurry comprising a ceramic sol of silica, filler particles of alumina and water was formed. Laminates of 8 harness satin weave mullite fibres, sold under the trade name Nextel 550 by Minnesota Mining and Manufacturing Company, or laminates of 8 harness satin weave alumina and mullite fibres, sold under the trade name Nextel 720 by Minnesota Mining and Manufacturing Company were impregnated with the ceramic sol. The impregnated laminates of fibres 12 were stacked 14 on the mould 10 and covered by a porous membrane 16, a breather fabric 18 and a vacuum bag 20.

The vacuum bag 20 was evacuated to a pressure less than 30 mbar (3000 Pa) and was heated to a temperature of 60° C. for 10 hours to produce an alumina/silica matrix composite. The alumina/silica matrix composite was then heated to a temperature of 1200° C. at atmospheric pressure to sinter the alumina/silica matrix composite.

The hollow mould shown in FIG. 1 was used to produce an aerofoil shaped ceramic matrix composite article for example a blade or vane for a compressor or turbine of a gas turbine engine. The method may also be used to make other ceramic matrix composite articles using suitably shaped moulds.

It is also possible to manufacture a ceramic matrix composite by forming a slurry comprising a ceramic sol, filler material and a suspension medium. The ceramic sol comprises any suitable ceramic for example silica, alumina, mullite, aluminosilicate, silicon nitride, silicon carbide etc. The filler material comprises particles of any suitable ceramic for example silica, alumina, mullite, silicon nitride, silicon carbide and the filler material particles are relatively large compared to the ceramic sol. The filler material particles have a diameter greater than 1 microns. The ceramic sol comprises particles having a diameter of the order of 40 nanometers. The suspension medium comprises for example water.

A number of laminates, or plies, of reinforcing fibres are formed. The laminates of fibres may be two dimensional weaves of fibres etc. The fibres may be any suitable fibres for reinforcing a ceramic matrix for example silica, alumina, mullite, aluminosilicate, silicon carbide, silicon nitride or other ceramic fibres.

Each of the laminates of fibres is impregnated with the slurry and the slurry impregnated laminates of fibres are stacked one on top of the other on a mould to form a stack. The mould is placed in an autoclave and the autoclave is evacuated to a pressure less than 30 mbar (3000 Pa) and is heated to a temperature of 60° C. for 10 hours to produce a ceramic matrix composite. The ceramic matrix composite is then heated to a temperature of 1200° C. at atmospheric pressure to sinter the ceramic matrix composite. The application of the low pressure on the slurry impregnated laminates of fibres causes the suspension medium to be removed from the ceramic sol and hence the ceramic sol solidifies causing the ceramic matrix to harden. The application of the low pressure causes the suspension medium to be drawn from the slurry impregnated laminates of fibres.

The slurry impregnated laminates of fibres are either heated during or after evacuation of the autoclave, to encourage the removal of suspension medium and hence the solidification of the ceramic sol. It may be possible to manufacture the ceramic matrix composite at room temperature without the application of heat, but it is preferred to provide heat during or after evacuation to reduce the manufacturing time. It is preferred to heat the slurry impregnated laminates of fibres to a temperature in the range 60 to 150° C. subject to temperature limitations of the mould.

The composition of the slurry is selected such that as the suspension medium is removed from the slurry the ceramic solidifies on the fibres to form the ceramic matrix without the formation of cracks in the ceramic matrix.

A sandwich structure 50, as shown in FIG. 3, comprises two layers 52 and 54 of a ceramic matrix composite with a layer 56 of ceramic filler arranged between the two layers 52 and 54 of ceramic matrix composite. The sandwich structure 50 has a plurality of apertures 58 and 60 to receive bolts whereby the sandwich structure 50 may be attached to other components. The apertures 58 and 60 are provided with ceramic tubes 62 and 64, which are arranged coaxially with the apertures 58 and 60 respectively, to reduce wear around the apertures 58 and 60.

The sandwich structure 50 is manufactured by firstly making the layers 52 and 54 of ceramic matrix composite.

The method of manufacturing the layer 52 of ceramic matrix composite, is shown in FIG. 2, and comprises forming a slurry comprising a ceramic sol, filler material and a suspension medium. The ceramic sol comprises any suitable ceramic for example silica, alumina, mullite, aluminosilicate, silicon nitride, silicon carbide etc. The filler material comprises particles of any suitable ceramic for example silica, slumina, mullite, aluminosilicate, silicon nitride, silicon carbide and the filler material particles are relatively large compared to the ceramic sol. The filler material particles have a diameter greater than 1 micrometer. The ceramic sol comprises particles having a diameter of the order of 40 nanometers. The suspension medium has the characteristic of being removable from the slurry by the application of a vacuum or by the combination of application of a vacuum and heat.

A number of laminates, or plies, of reinforcing fibres are formed. The laminates of fibres may be two dimensional weaves of fibres etc. The fibres may be any suitable fibres for reinforcing a ceramic matrix for example silica, alumina, mullite, aluminosilicate, silicon carbide, silicon nitride or other ceramic fibres.

Each of the laminates of fibers is impregnated with the slurry and the slurry impregnated laminates of fibers 32 are stacked one on top of the other on a mold 30 to form a stack 34. The stack 34 is covered by a porous membrane 36, for example a wet filter paper or a perforated plastic sheet. The porous membrane 36 is covered by a breather fabric or bleeder pack 38 and then the breather fabric 38 is covered by a vacuum bag 40. The vacuum bag 40 is sealed around the mold 30.

The interior of the vacuum bag 40 is then connected to a vaccum pump 44 via a pipe 42. The interior of the vacuum bag 40 is then evacuated to a suitably low pressure to consolidate the ceramic matrix composite. The interior of the vacuum bag 40 is evacuated to a pressure less than about 30 mBar (3000 Pa). The application of the low pressure on the slurry impregnated laminates of fibres 32 causes the suspension medium to be removed from the ceramic sol and hence the ceramic sol solidifies causing the ceramic matrix to harden. The application of the low pressure causes the suspension medium to be drawn from the slurry impregnated laminates of fibres 32 through the porous membrane 36 into the breather fabric 38.

The slurry impregnated laminates of fibres 32 are either heated during or after evacuation of the vacuum bag 40, in an autoclave, to encourage the removal of suspension medium and hence the solidification of the ceramic sol.

The resulting ceramic matrix composite is then pressure less sintered by heating to a relatively high temperature at atmospheric pressure. The ceramic matrix composite layer 52 is then machined to size and apertures drilled. To reduce porosity of the ceramic matrix composite layer 52, the ceramic matrix composite 52 is infiltrated with ceramic sol by immersing in a bath of ceramic sol and applying a vacuum. The ceramic matrix composite 52 is then reheated to a relatively high temperature.

The same process is used to manuacture the layer 54 of ceramic matrix composite.

The two layers 52 and 54 are then assembled to define the predetermined shape, or profile, of the component, or article. Ceramic tubes 63,64 are inserted coaxially in the apertures 58 and 60. The open ends and edges of the assembly are sealed and a ceramic filler 56 is arranged into the space defined between the two ceramic matrix composite layers 52 and 54. The ceramic filler is allowed to cure at room temperature and finally the sandwich structure is heated in an autoclave at a relatively high temperature to produce the finished sandwich structure 50. The ceramic filler may be castable ceramic filler, a foamed ceramic etc for example foamed alumina, low density aluminosilicate insulation etc.

EXAMPLE 2

A slurry comprising alumina and silica powders and water was formed, the loading of solids was 40 vol % and the ratio of alumina to silica was 95 to 5 by volume. Twelve laminates of 8 harness satin weave and mullite fibres, sold under the trade name Nextel 720 by Minnesota Mining and Manufacturing Company, were impregnated with the ceramic slurry to make each layer 52,54 of ceramic matrix composite. The impregnated laminates of fibres 32 were stacked 34 on the mould 30 and covered by porous membrance 36, a breather fabric 38 and vacuum bag 40.

The vacuum bag 40 was evacuated to a pressure less than 30 mbar (3000 Pa) and was heated to a temperature of 40° C. for 12 hours to produce an alumina/silica matrix composite layer 52,54. The alumina/silica matrix composite layer 52,54 was then heated to a temperature of 1250° C. for 4 hours to sinter the alumina/silica matrix composite layers 52,54.

The layers 52,54 were then machined to size and apertures 58 were drilled.

The layers 52,54 were immersed in an alumina sol bath, then evacuated and refired at 900° C. for 1 hour. The immersing in the alumina sol bath was repeated until the porosity was reduced sufficiently. The layers 52,54 are finally heated to 1250° C. for 1 hour.

The layers 52,54 were assembled into position so that the apertures 58,60 are coaxial and alumina tubes 62 and 64 were inserted coaxially into the apertures 58,60 respectively.

The open ends and edges between the layers 52 and 54 were sealed, for example using polyester tape, and a wet mix of a castable ceramic filler 56 was vibrocast into the space between the layers 52 and 54. The ceramic filler 56 was allowed to cure at room tempeatue for 12 hours. The sandwich structure 50 was then heated in an autoclave to a tempeature of 1200° C. for 1 hour to produce the finished component, or article.

An alternative method of manufacturing the sandwich structure 50, shown in FIG. 4, comprises using a shaped ceramic filler 56 as a mould 70 and manufacturing layers 52,54 of ceramic matrix composite on the surfaces of the ceramic filler 56, such that the ceramic matrix composite layers 52 and 54 and ceramic filler 56 form the sandwich structure 50.

The sandwich structure 50 is manufactured by firstly making the ceramic filler to the required shape so that it forms a mould 70. For example foamed alumina may be machined to the required shapes.

A number of laminates of reinforcing fibres are formed, each of the laminates of fibres is impregnated with a slurry and the slurry impregnated laminates of fibres 72 are stacked one on top of the other on the mould 70 to form stacks 74A,74B on the surfaces of the mould 70. The stacks 74A,74B are covered with porous membranes 76, the porous membranes 76 are covered by a breather fabric 78 and the breather fabric 78 is covered by a vacuum bag 80. The vacuum bag 80 is sealed around the whole assembly.

The interior of the vacuum bag 80 is then connected to a vacuum pump 84 via a pipe 82. The interior of the vacuum bag 80 is then evacuated to a suitably low pressure as discussed previously to consolidate the ceramic matrix composite layers as discussed previously.

Thus in this case the ceramic matrix composite layers 52,54 are formed integrally with the mould to form the sandwich structure 50.

We claim:

1. A method of manufacturing a ceramic matrix composite using fibers comprising the steps of:
   (a) forming a slurry comprising a ceramic sol, filler material and a suspension medium,
   (b) forming a plurality of laminates of the fibers,
   (c) applying the slurry to each of the plurality of laminates of fibers,
   (d) stacking the plurality of laminates of fibers on a mold,
   (e) applying pressure to the stack of laminates of fibers at a low temperature to remove the suspension medium from the slurry to solidify the ceramic sol and thereby produce a ceramic matrix composite,
   (f) pressure less sintering the ceramic matrix composite at a high temperature and at atmospheric pressure wherein step (e) further comprises covering the stack with a porous membrane, covering the porous membrane with a breather fabric, covering the breather fabric with a vacuum bag and evacuating the vacuum bag to remove the suspension medium from the slurry to solidify the ceramic sol and thereby produce the ceramic matrix composite and evacuating the vacuum bag to a pressure less than 3000 Pa and holding at that pressure for about 10 hours.

2. A method as claimed in claim 1 wherein the ceramic sol comprises silica, alumina or mullite particles and the filler material comprises silica, alumina or mullite particles.

3. A method as claimed in claim 2 wherein the filler material particles have a diameter greater than 1 micron.

4. A method as claimed in claim 2 wherein the ceramic sol particles having a diameter of about 40 nanometers.

5. A method as claimed in claim 1 wherein the fibres comprise silica, alumina, mullite or a mixture of any two.

6. A method as claimed in claim 1 wherein step (f) comprises pressure less sintering the ceramic matrix composite at a temperature of about 1200° C. to 1260° C.

7. A method of manufacturing a ceramic matrix composite using fibers comprising the steps of:
   (a) forming a slurry comprising a ceramic sol, filler material and a suspension medium,
   (b) forming a plurality of laminates of the fibers,
   (c) applying the slurry to each of the plurality of laminates of fibers,
   (d) stacking the plurality of laminates of fibers on a mold,
   (e) applying pressure to the stack of laminates of fibers at a low temperature to remove the suspension medium from the slurry to solidify the ceramic sol and thereby produce a ceramic matrix composite,
   (f) pressure less sintering the ceramic matrix composite at a high temperature and at atmospheric pressure wherein step (e) further comprises covering the stack with a porous membrane, covering the porous membrane with a breather fabric, covering the breather fabric with a vacuum bag and evacuating the vacuum bag to remove the suspension medium from the slurry to solidify the ceramic sol and thereby produce the ceramic matrix composite, and heating the stack during or after evacuation of the vacuum bag to encourage the solidification of the ceramic sol.

8. A method as claimed in claim 7 comprising heating the stack to a temperature in the range 60° C. to 150° C.

9. A method of manufacturing a ceramic matrix composite using fibers comprising the steps of:
   (a) forming a slurry comprising a ceramic sol, filler material and a suspension medium,
   (b) forming a plurality of laminates of the fibers,
   (c) applying the slurry to each of the plurality of laminates of fibers,
   (d) stacking the plurality of laminates of fibers on a mold,
   (e) applying pressure to the stack of laminates of fibers at a low temperature to remove the suspension medium from the slurry to solidify the ceramic sol and thereby produce a ceramic matrix composite,
   (f) pressure less sintering the ceramic matrix composite at a high temperature and at atmospheric pressure, wherein the mould is hollow and has an inner surface, the method further comprising stacking the laminates of fibres on the inner surface of the hollow mould.

10. A method of manufacturing a ceramic matrix composite using fibers comprising the steps of:
    (a) forming a slurry comprising a ceramic sol, filler material and a suspension medium,
    (b) forming a plurality of laminates of the fibers,
    (c) applying the slurry to each of the plurality of laminates of fibers,
    (d) stacking the plurality of laminates of fibers on a mold,
    (e) applying pressure to the stack of laminates of fibers at a low temperature to remove the suspension medium from the slurry to solidify the ceramic sol and thereby produce a ceramic matrix composite,
    (f) pressure less sintering the ceramic matrix composite at a high temperature and at atmospheric pressure, wherein the mould defines an aerofoil shape.

11. A method of manufacturing a ceramic matrix composite using fibers comprising the steps of:
    (a) forming a slurry comprising a ceramic sol, filler material and a suspension medium,
    (b) forming a plurality of laminates of the fibers,
    (c) applying the slurry to each of the plurality of laminates of fibers,
    (d) stacking the plurality of laminates of fibers on a mold,
    (e) applying pressure to the stack of laminates of fibers at a low temperature to remove the suspension medium from the slurry to solidify the ceramic sol and thereby produce a ceramic matrix composite,
    (f) pressure less sintering the ceramic matrix composite at a high temperature and at atmospheric pressure, wherein the fibres comprise mullite or mullite and alumina, the ceramic sol comprises silica and the filler material comprises alumina.

12. A method of manufacturing a sandwich structure comprising at least two layers of ceramic matrix composite and a ceramic filler arranged between the at least two layers of ceramic matrix composite, the method comprising the steps of:
  a) forming a mold from a ceramic filler material to a predetermined shape, the mold having spaced apart surfaces,
  b) forming a slurry comprising a ceramic sol, filler material and a suspension medium,
  c) forming a plurality of laminates of fibers,
  d) applying the slurry to each of the plurality of laminates of fibers,
  e) stacking the plurality of the laminates of fibers on the mold, the plurality of laminates being stacked on the spaced apart surfaces of the mold, and
  f) applying pressure to the stack of laminates of fibers to remove the suspension medium from the slurry to solidify the ceramic sol and thereby produce a sandwich structure comprising at least two ceramic matrix composite layers and a ceramic filler material between the at least two layers of ceramic matrix composite,
wherein the mold is hollow and has an inner surface, the method comprising stacking the laminates of fibers on the inner surface of the hollow mold.

* * * * *